Figure 1:
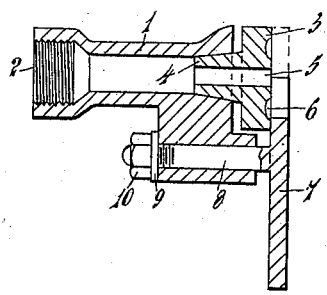

J. MILBURN.
SPRAYING NOZZLE.
APPLICATION FILED MAR. 11, 1910.

977,748.

Patented Dec. 6, 1910.

Witnesses:
G. P. Kramer
Milton Ottenberg.

Inventor.
Joseph Milburn
by Foster, Freeman, Watson & Coit
Attorneys

UNITED STATES PATENT OFFICE.

JOSEPH MILBURN, OF HAVELOCK NORTH, NEW ZEALAND.

SPRAYING-NOZZLE.

977,748.  Specification of Letters Patent.  Patented Dec. 6, 1910.

Application filed March 11, 1910. Serial No. 548,713.

*To all whom it may concern:*

Be it known that I, JOSEPH MILBURN, a citizen of the Dominion of New Zealand, and residing at Havelock North, in the Provincial District of Hawke's Bay, in the Dominion of New Zealand, have invented certain new and useful Improvements in an Improved Spraying-Nozzle, of which the following is a specification.

The invention relates to spraying with liquid solutions and mixtures, and provides improvements for producing a fine spray.

According hereto spray is produced by forcing the material through the mouth of a tube in such manner that it impinges against the edge of an opening in a disk.

I will now particularly describe my invention by the aid of the drawing wherein—

Figure 2:
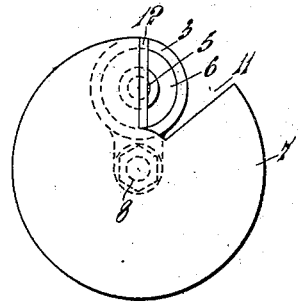
Figure 3:
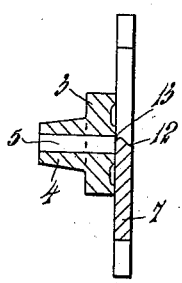

Figure 1, is a sectional elevation, Fig. 2, an end elevation, and Fig. 3, a part sectional plan of a nipple and part of a disk.

The socket 1 is secured by means of its screwed end 2 upon the tube through which the liquid or mixture to be sprayed is forced by a pump or other usual means. A nipple 3 has a conical end 4 fitting a hole in said socket, and at its other end a discharge opening 5 is surrounding by an annular groove 6. The plate 7 which may be disk shaped has a stem 8 revoluble in a hole in the socket 1, said stem having a threaded end, upon which a washer 9 and a nut 10 by means of which the disk is held against the face of the nipple, the disk being revoluble to regulate the position of a trangular opening 11 in the disk relatively to the opening 5, and also, when desired, to totally close said opening. The edge of the opening 11 has the bevel 12 at the top, which enables the edge to be easily kept true by filing or otherwise, while the underside of the edge is beveled to form a striking plane 13 against which the liquid impinges.

The face of the nipple can be readily kept in order by rubbing it on a suitable abrading surface or by grinding the nipple and disk together with ground glass or the like. The annular groove 6 facilitates the truing up of the face of the nipple and prevents the escaping fluid from following the direction of the lower edge of the plane 13 and producing a drip. By turning the disk the position of the opening therein relatively to the opening 5 may be adjusted to vary the quantity of spray without unduly altering the quality or spread thereof. It will be obvious that there may be a plurality of holes through the nipple and also a number of openings in the disk. The disk may have two or more openings with striking planes at different angles thereby enabling various qualities of spray to be obtained from the same nozzle.

What I do claim and desire to secure by Letters Patent of the United States is:—

1. The herein described spraying nozzle comprising a socket adapted to be attached to a supply pipe and having a discharge aperture at one end, and a disk movable across the outer end of the discharge aperture and provided with an opening adapted to pass over said aperture, one edge of which opening is beveled on both its exterior and interior surfaces.

2. The herein described spraying nozzle comprising a socket adapted to be attached to a supply pipe and having an outwardly flaring discharge aperture at one end, a nipple having an unthreaded tapering end section inserted in said discharge aperture, and a disk movable across the outer face of the nipple and having an aperture provided with a beveled edge against which liquid issuing from the nipple impinges.

3. The herein described spraying nozzle comprising a socket adapted to be attached to a supply pipe and having a discharge aperture at one end, an annular groove being formed about the outer end of said aperture, and a rotatable disk having an opening therein adapted to move over said groove, and across the discharge aperture as the plate is turned, one edge of said opening being beveled.

In testimony whereof I have signed my name to this specification in the presence of two witnesses.

JOSEPH MILBURN.

Witnesses:
  WALTER JAMES WHITE,
  ALFRED WILLIAMSON PARKINSON.